United States Patent [19]
Reznikov et al.

[11] Patent Number: 5,657,642
[45] Date of Patent: Aug. 19, 1997

[54] APPARATUS FOR COOLING FOOD PRODUCTS

[76] Inventors: Lev Reznikov, 1510 Ocean Pky., #A17, Brooklyn, N.Y. 11230; Zachary Schulman, 30 Spring Meadow Rd., Mount Kisco, N.Y. 10536

[21] Appl. No.: 562,578

[22] Filed: Nov. 24, 1995

[51] Int. Cl.⁶ .................................................. F25D 3/12
[52] U.S. Cl. .................................... 62/384; 62/299
[58] Field of Search ............................ 62/603, 384, 388, 62/299

[56] References Cited

U.S. PATENT DOCUMENTS 1,735,094  11/1929  Slate .......................................... 62/603

*Primary Examiner*—Ronald C. Capossela
*Attorney, Agent, or Firm*—Iiya Zborovsky

[57] ABSTRACT

For cooling food products in a container, an apparatus is provided which includes a supply structure for supplying liquid carbon dioxide into the interior of the container and discharging liquid carbon dioxide in the interior to form a carbon dioxide flow, and also has a withdrawing structure for withdrawing carbon dioxide vapors generated in the container and moving them in the vicinity of the supplying structure, so that cold of the carbon dioxide vapors is transferred to liquid carbon dioxide supplied by the supplying structure.

9 Claims, 8 Drawing Sheets

APPARATUS FOR COOLING FOOD PRODUCTS

BACKGROUND OF THE INVENTION

The present invention relates to a method of and an apparatus for cooling food products for example in rail cars, containers, vessels, trucks, etc.

It is well known to cool food products with carbon dioxide. In known methods and apparatuses liquid carbon dioxide is supplied into the interior of a container and discharged through a plurality of nozzles so that the liquid carbon dioxide is chilled and forms snow which covers food products accommodated in the container. While the existing methods and apparatuses perform their intended functions in satisfactory manner, it is always desirable to reduce liquid carbon dioxide consumption and to increase efficiency of the method and the system so as to either produce the same amount of snow with lower liquid carbon dioxide consumption, or with the same energy supply produce more snow.

SUMMARY OF THE INVENTION

Accordingly, it is an object of the present invention to provide a method of and an apparatus for cooling food products, which is a further improvement of the existing methods and apparatuses.

It is also an object of the present invention to provide such a method and apparatus which allow producing of cold by supplying liquid carbon dioxide from outside of a food container, in particular for example from outside terminals, into the food container which is not supplied with corresponding devices for producing carbon dioxide snow.

In keeping with these objects and with others which will become apparent hereinafter, one feature of the present invention resides, briefly stated, in a method of cooling food products, which has the steps of supplying liquid carbon dioxide into a container through supplying means so that liquid carbon dioxide is discharged in the container to produce carbon dioxide snow with simultaneous generation of carbon dioxide vapors, and withdrawing the carbon dioxide vapors through withdrawing means located outside of the container in the vicinity of the supplying means so that carbon dioxide vapors during their withdrawal transfer their cold to liquid carbon dioxide supplied by the supplying means.

It is also an object of the present invention to provide an apparatus for cooling food products, which comprises means for supplying liquid carbon dioxide into the interior of the container and discharging liquid carbon dioxide in the interior so as to form carbon dioxide snow in the container with simultaneous generation of carbon dioxide vapors, and means for withdrawing the carbon dioxide vapors from the container and moving the withdrawn carbon dioxide vapors in the vicinity of the supplying means so that cold from the withdrawn carbon dioxide vapors is transmitted to liquid carbon dioxide supplied by the supplying means, the supplying means and the withdrawing means being located outside of the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
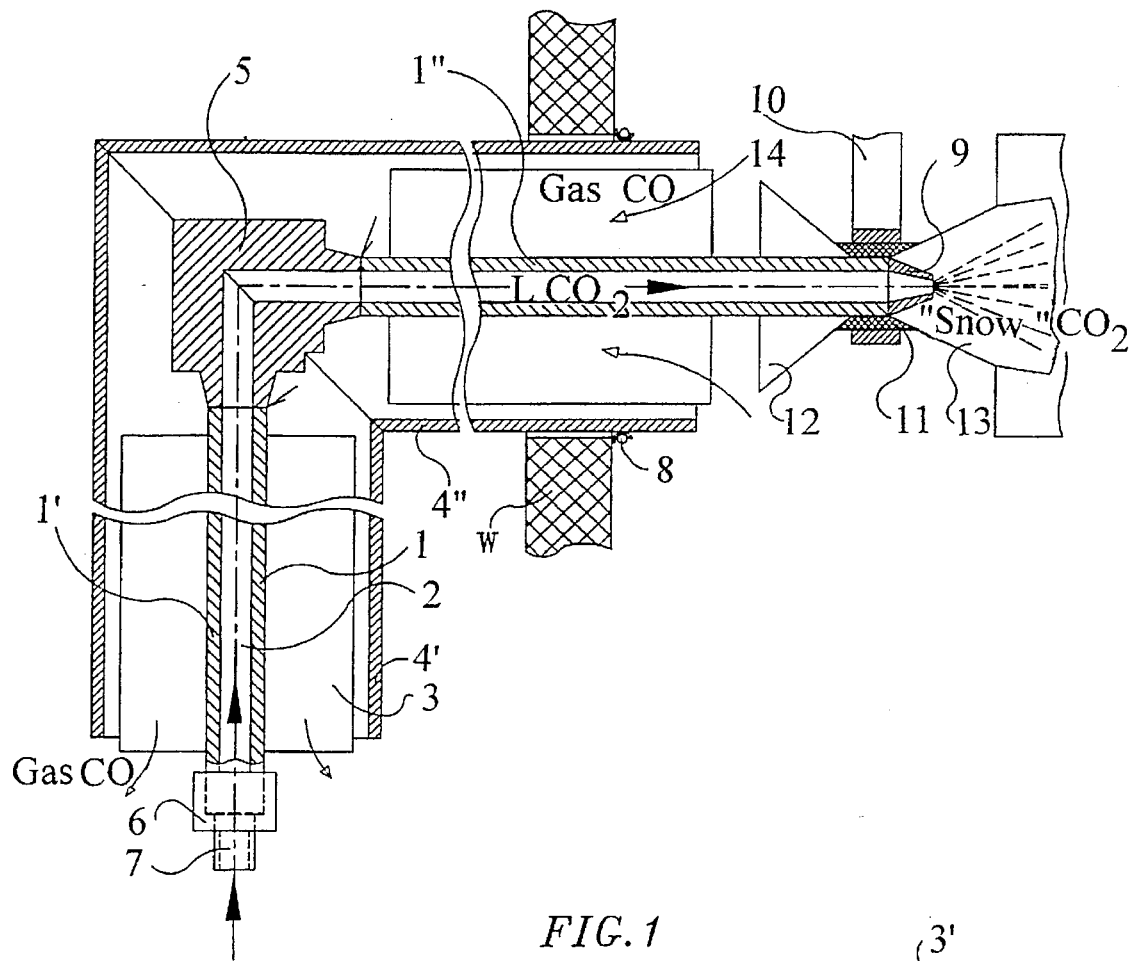
FIG. 1 is a view schematically showing an apparatus for cooling food products in accordance with the present invention.

An apparatus in accordance with the present invention is used for producing carbon dioxide snow in a container which is identified with reference C and has a wall W. The apparatus has an inner tube 1 provided with an inner passage 2 and a plurality of longitudinal fins 3. An outer tube 4 surrounds the inner tube 1 at a radial distance therefrom which can be defined by the fins 3 and forms an outer passage 5. The passage 2 of the inner tube 1 can be characterized as a high pressure passage while the passage 5 of the outer tube 4 can be characterized as a low pressure passage. Both tubes have two portions 1' and 1", and 4' and 4" which extend substantially perpendicularly relative to one another and are connected with one another by a connector 5. The lower end of the inner tube 1 in the drawing is connected through a connector 6 with a hose 7 extending from a supply tank for supplying liquid carbon dioxide. The horizontal portion 4" of the outer tube 4 extends through an inner opening of the wall W of the container C and can be sealed there by seals 8. The horizontal portion 1" of the inner tube 1 extends further into the interior of the container and is provided at its end with a nozzle 9. This end can be mounted in an opening of a mount 10 of the container with interposition of the sealing ring 11. A part of the portion 1" of the inner tube 1 can be provided with a guide cone 12. Finally, a horn 13 can extend from the right end of the inner tube portion 1" into a bunker 13.

In order to produce carbon dioxide snow in the container 1, the apparatus is inserted through the opening of the wall W of the container C as shown in the drawings, and liquid carbon dioxide is supplied through the interior of the inner tube 1. It is charged with throttling through the nozzle 9 and produced carbon dioxide snow in the interior of the container so as to cool food products accommodated in the container. During this process, carbon dioxide vapors are produced. As identified with arrows 14 carbon dioxide vapors move in the low pressure passage 5 between the outer tube 4 and the inner tube 1 under the action of high pressure during discharge of the liquid carbon dioxide through the nozzle. The carbon dioxide vapors move in counterflow relative to the flow of liquid carbon dioxide and, cold of carbon dioxide vapors is transferred through the inner tube 1 to the liquid carbon dioxide supplied through the passage 2 of the inner tube 1.

This process is facilitated by a plurality of fins provided on the inner tube 1.

Figure 2:
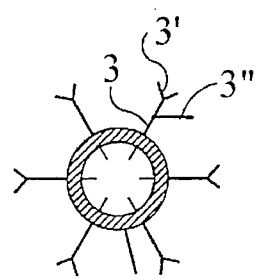
FIG. 2 is a view schematically showing a section of an element which is used for transferring of cold of carbon dioxide vapors to liquid carbon dioxide.

The inner tube 1 with the fins 3 can be formed as an extruded aluminum structure. As shown in FIG. 2, the fins can be formed by a plurality of elements 3' arranged in a starlike manner around the inner tube 1 and provided with a plurality of branches 3" so as to increase the heat transfer surface between carbon dioxide vapors and the fins.

Figure 3A:
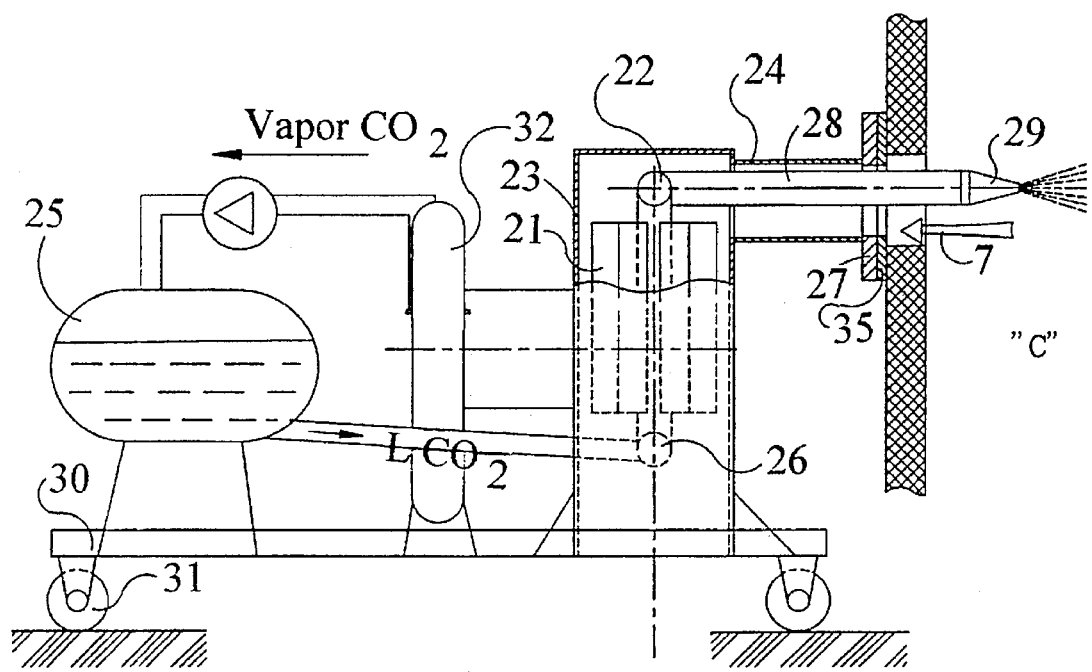
FIGS. 3a and 3b are a side view and a plan view of an apparatus in accordance with a further embodiment of the present invention.
Figure 3B:
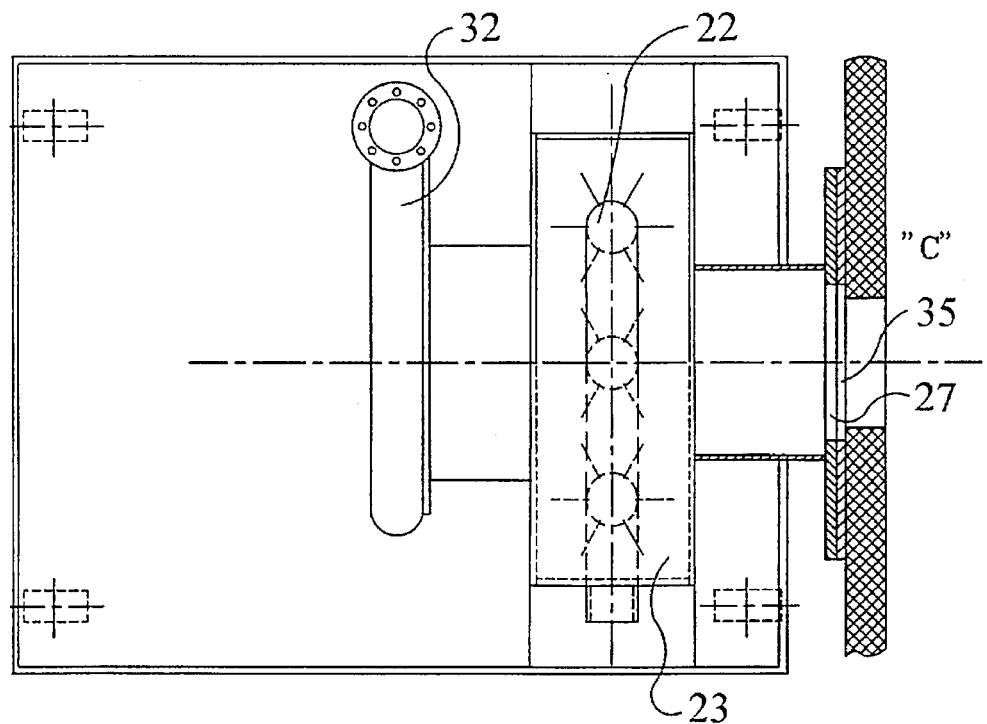

An apparatus shown in FIGS. 3a and 3b, includes a plurality of extrusion aluminum tubes 21 provided with a plurality of fins and extending between two collectors 22. The package of the tubes is accommodated in a casing 23. An outer tube 24 is connectable by a flange 27 with a wall W of a container C. The upper collector 22 is connected with a pipe 28 provided with a nozzle 29 on its end. The apparatus further has a supporting frame 30 provided with a plurality of wheels 31. A fan 32 communicates with the interior of the casing 23. Liquid carbon dioxide is supplied from a tank 25 into a lower collector 26 and then through the pipes 21, the upper collector 22, the nozzle 29 into the container C.

Figure 3C:
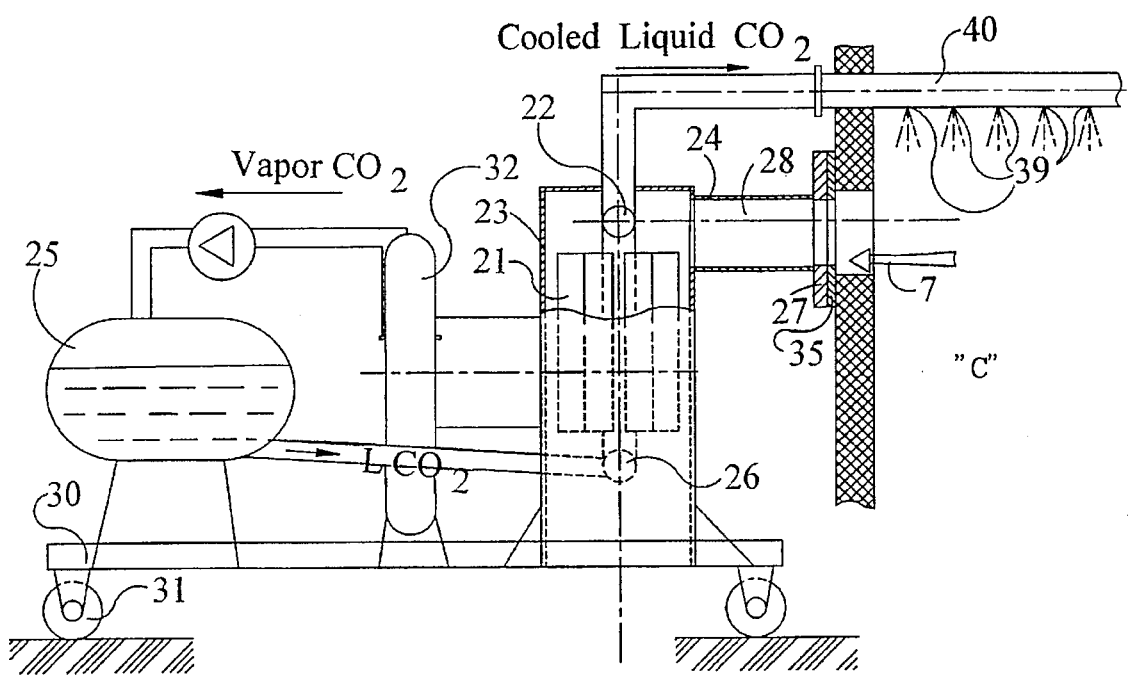
FIG. 3c is a further embodiment of the present invention.

It is believed that the operation of the apparatus of FIGS. 3a and 3b is self-explanatory. The apparatus is moved toward the container 1 and its flange 27 is connected with the container C or more particularly with its outer flange 35 for example by bolts. Liquid carbon dioxide is discharged through the nozzle 29 into the interior of the container so as to form carbon dioxide flow for cooling the food products. Carbon dioxide vapors move from the container into the interior of the outer pipe 24 under the action of suction of the fan 32 and pass between the aluminum tubes 21 and their fins so that cold of carbon dioxide vapors is transferred to liquid carbon dioxide. Then the vapors can be liquefied and supplied through a casing 23 further into the tank 25. The fan 32 can be Used for intensification of movement of carbon dioxide vapors from the container with low excessive pressure inside. As shown in FIG. 3c, nozzles 39 can be arranged on a dispenser 40 located inside the container C. In this case the pipe 28 is releasably connectable with the dispenser 40.

Figure 4A:
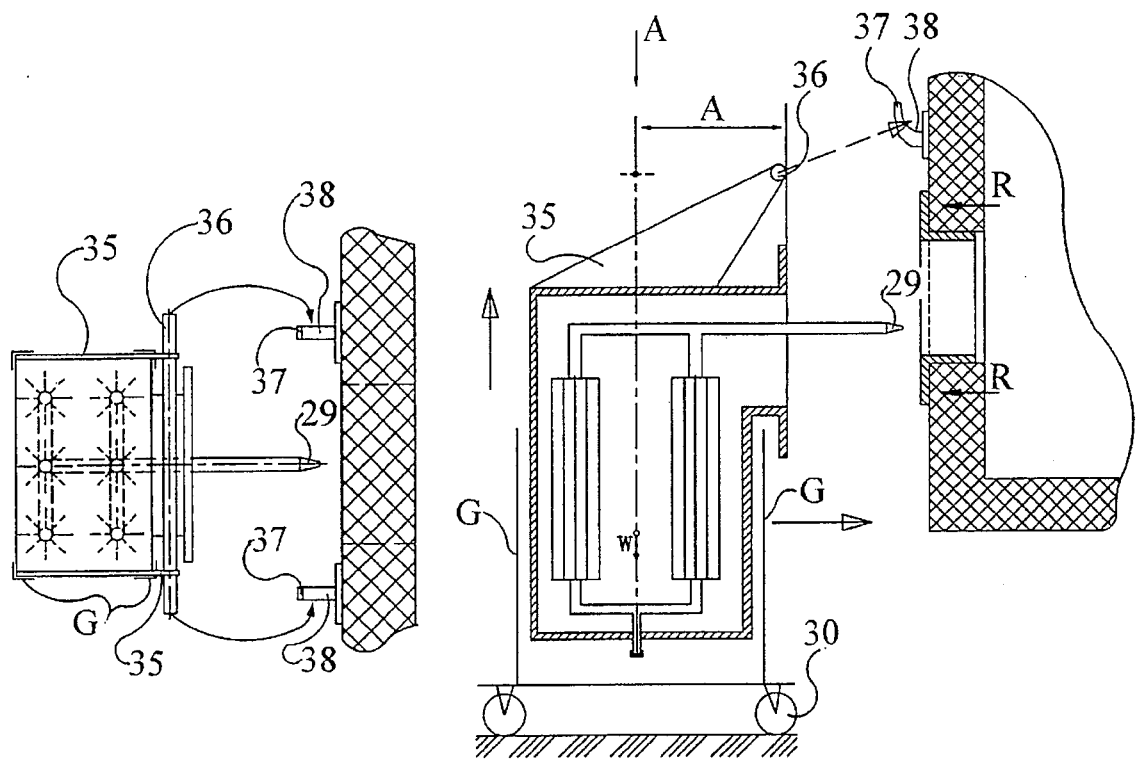
FIGS. 4a and 4b are views showing connection of the apparatus in accordance with the present invention with a container for storing food products.
Figure 4B:
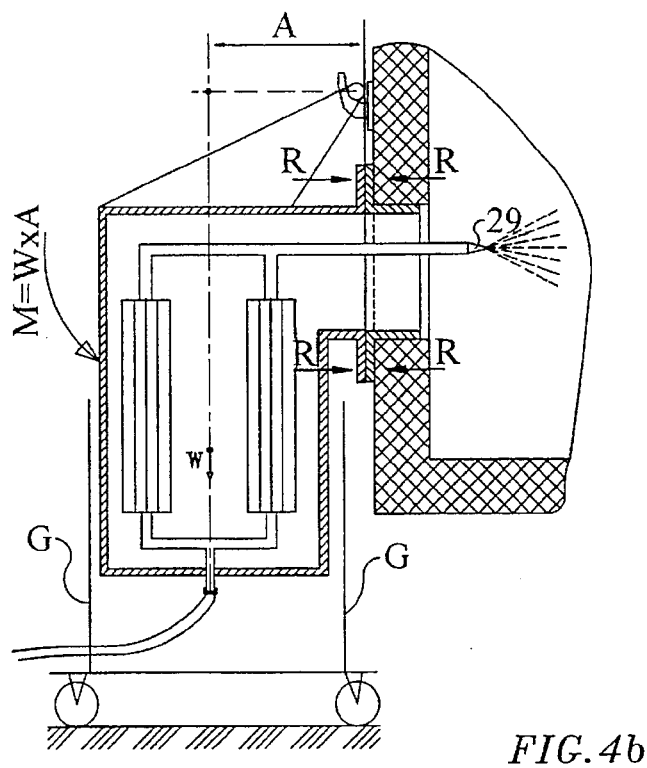

As can be seen from FIGS. 4a and 4b, the apparatus can be provided with arms 35 having lateral cross rods 36 which connect the free ends of the arms, while matching arm brackets 37 with slots 38 can be provided on upper edges of the arms mounted on the container above its opening. For installation, the heat exchanger block B is displaced upwardly in guides G of the frame 30, then the apparatus is moved toward the container C until the cross rod 36 is positioned about the slot 38, and the block B is lowered to pivotally engage the rod 36 into the slot 38. The thusly suspended system can turn under the action of its weight around the rod, and the flange of the system is tightly pressed against the flange of the container.

Figure 5:
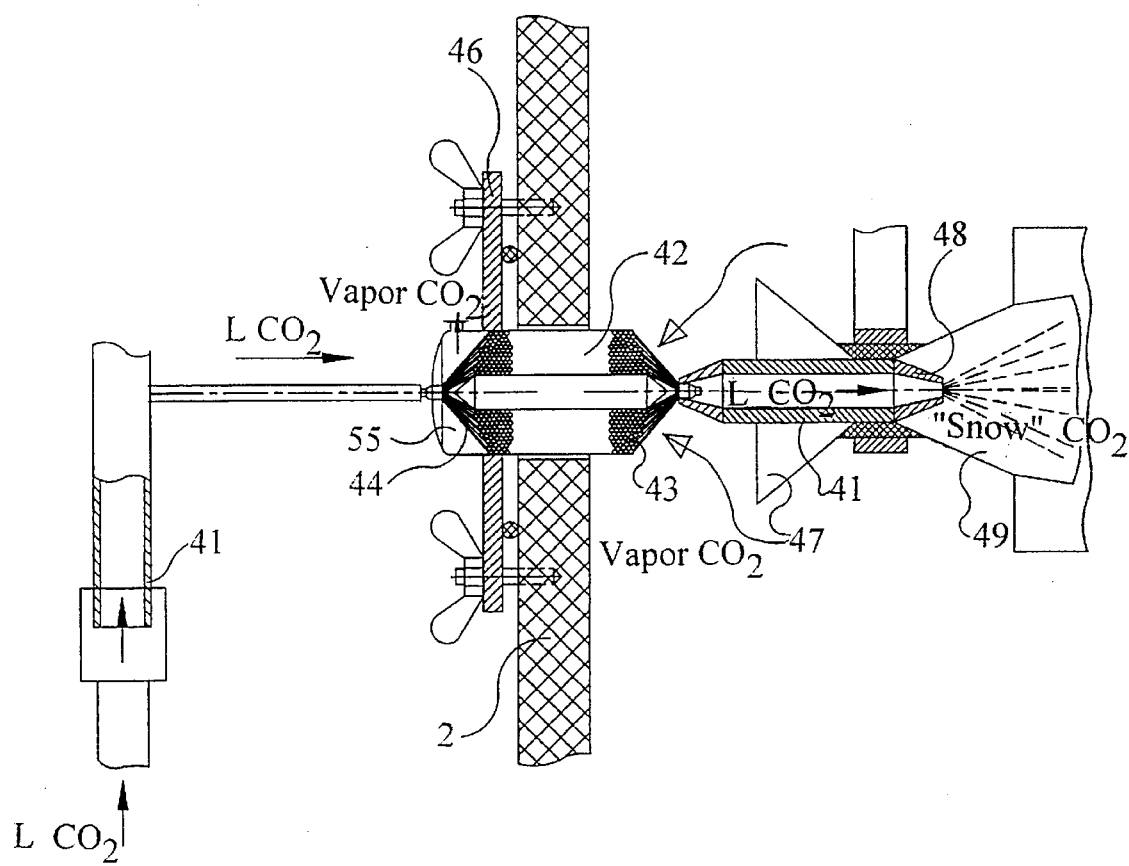
FIG. 5 is a view showing a further modification of the apparatus in accordance with the present invention.

In the embodiment shown in FIG. 5 a tube 41 for supplying liquid carbon dioxide extends through a heat exchanging element 42 provided with a plurality of coiled tubes 43 with fins spaced from one another by spaces 44. A low pressure channel 55 is formed between an outer tube and the coil tubes. The element 42, 43, 44 is mounted in an inner Opening of the wall 2 of the container 1 by a mounting flange 46. The apparatus is provided with a guide cone 47. A nozzle 48 is arranged on the end of the tube 41 and associated with a horn 49. The nozzle is always fixed in the same position inside of the horn, while the element 42, 43, 44 provides for a possibility to adjust the position of the nozzle 48 before supplying a liquid carbon dioxide, or to change the position during the supply to provide uniform distribution of carbon dioxide snow in the container, because the element 42, 43, 44 is arranged movable in its axial direction in the opening of the wall 2 of the container.

Figure 6A:
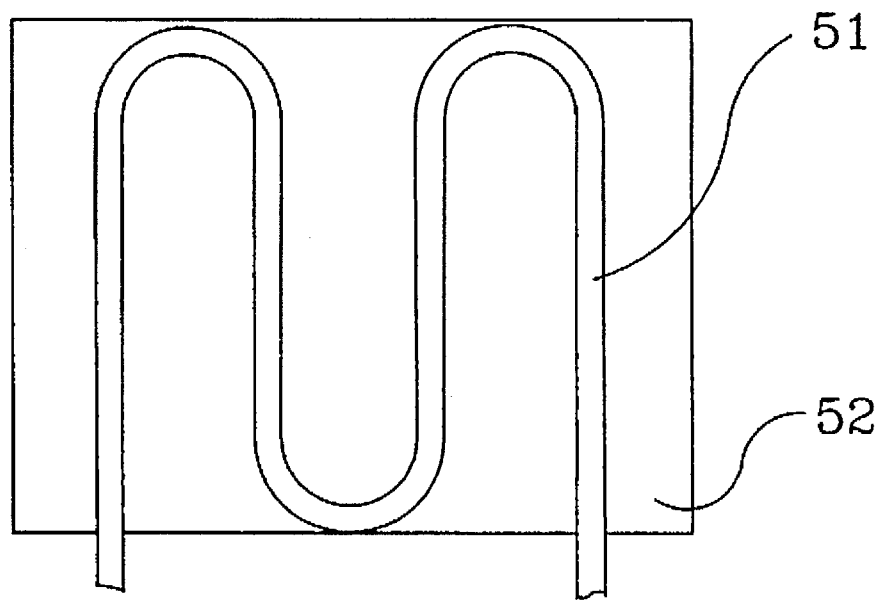
FIGS. 6a and 6b are a front view and a side view of a heat exchanging element of the inventive apparatus.
Figure 6B:
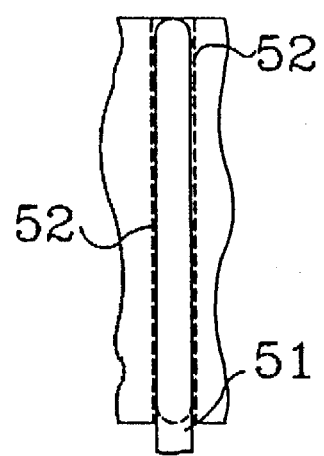

In accordance with a further feature of the inventive apparatus, snow flakes produced during the operation are filtered from carbon dioxide vapors which are utilized for additional cooling Of the supplied carbon dioxide. As shown in FIG. 6a, 6b the heat exchanging element shown here has a pipe 51 for supplying liquid carbon dioxide, which is finned with a metal wire net or mesh 52. In installed position, the net or mesh 52 is arranged transverse to the flow of carbon dioxide vapors. The net or mesh 52 is formed so that it is permeable for carbon dioxide vapors, but snow flakes of carbon dioxide are retained and precipitate on the net or mesh. Such a heat exchanging element can be installed for example in the inlet opening 13 of the container so that the net or mesh 52 overlaps the inlet opening. After the precipitation the snow flakes are sublimated, returning the refrigeration to liquid carbon dioxide through the high heat conductive mesh 52, so that the mesh simultaneously performs the double function of being a filter element and an efficient heat exchanger.

Figure 7A:
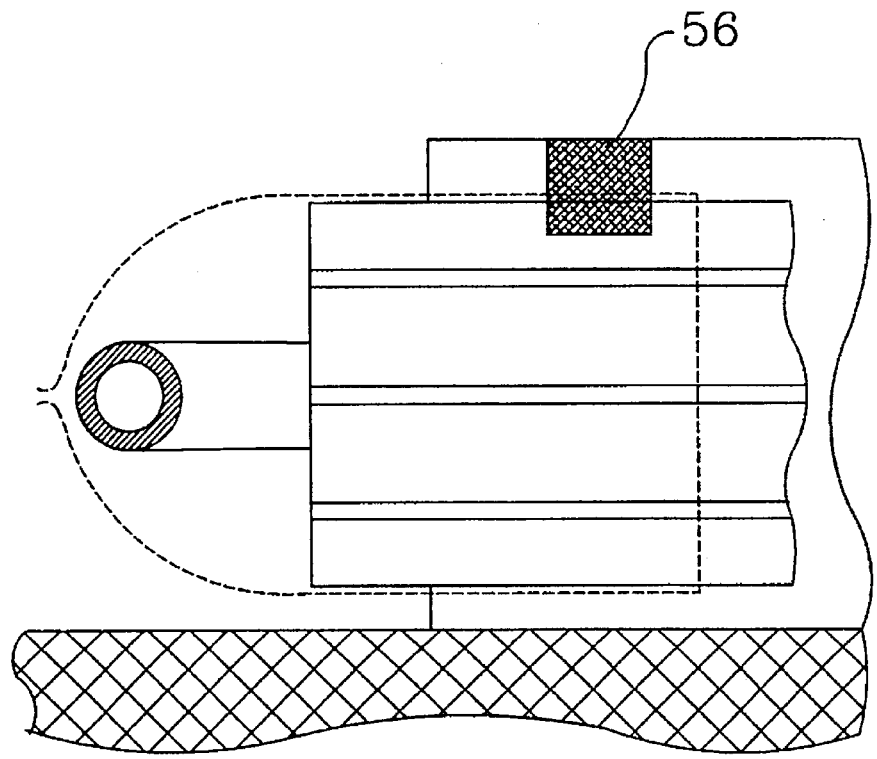
FIGS. 7a and 7b are a side view and a front view of the heat exchanging element of the inventive apparatus in accordance with a further embodiment of the invention.
Figure 7B:
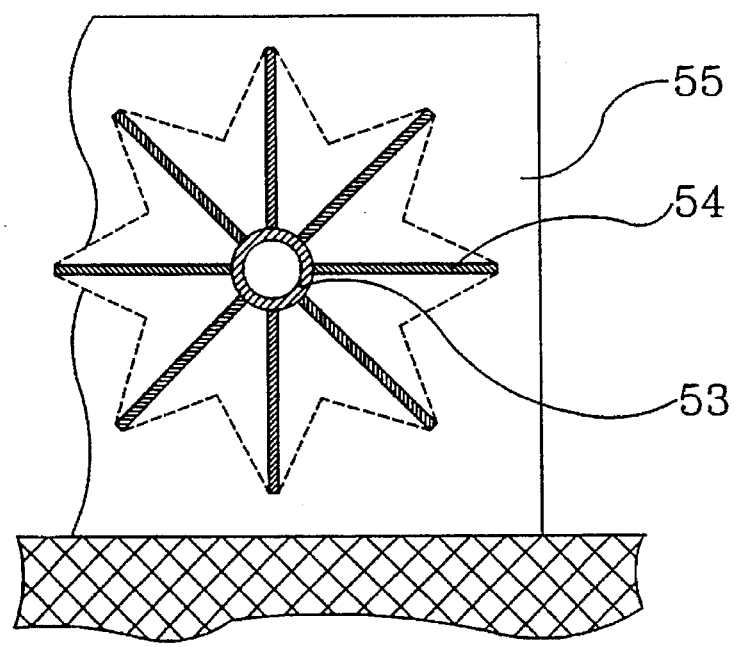

In accordance with another embodiment shown in FIGS. 7a, 7b the heat exchanging element has a pipe 53 with a plurality of longitudinally extending fins 54 arranged in a star-like manner. It is arranged in a casing 55. Wire nets 56 are soldered or welded to support edges of the fins 54 to provide a reliable mechanical connection and low contact thermal resistance of the connection between supporting elements and main filtering elements. The heat exchanging element can also be provided with an elastic sealant 56 of the vapor flow.

Figure 8:
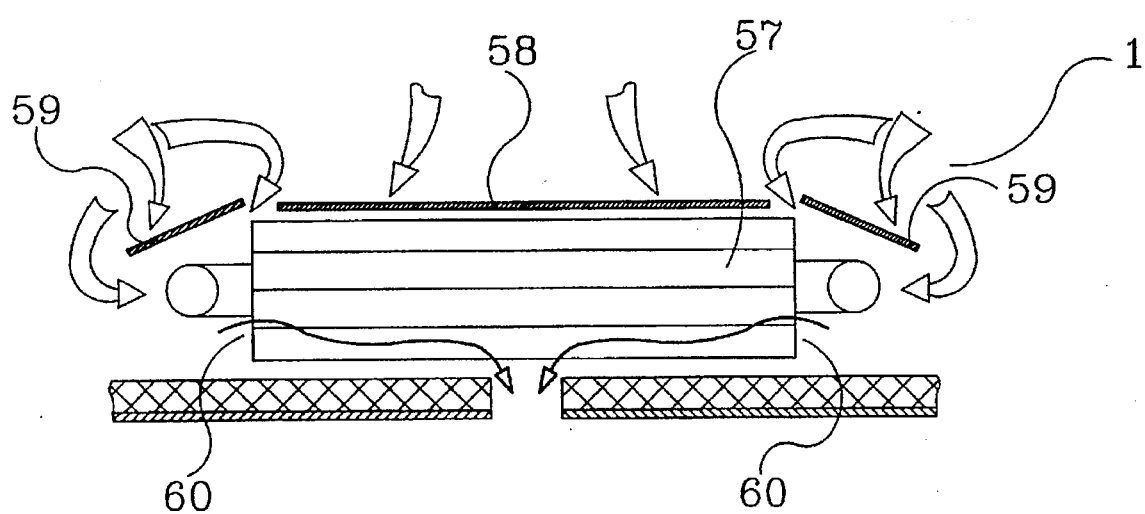
FIG. 8 is a view showing a still further modification of the heat exchanging element of the inventive apparatus.

FIG. 8 shows another heat exchanging element with separation of snow flakes from the vapor stream. Heat exchanging elements 57 are arranged in a casing 58 which is open at both ends to the vapor flow. Screens-deflectors of the vapor flow 59 are installed on the opening 60 in the casing 58 to separate parts of dry ice which move with a high speed with the vapor stream, carrying out the snow flakes. Sharp change of the direction of stream speed vector provides effective separation of solid particles having high density from the stream. The best effect is obtained when the screens are arranged under angles 20°–60° to the main direction of the stream inside or outside of the container.

It will be understood that each of the elements described above, or two or more together, may also find a useful application in other types of constructions and methods differing from the types described above.

While the invention has been illustrated and described as embodied in a method of and apparatus for cooling food products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for cooling food products in a container having an opening, the apparatus comprising means for supplying liquid carbon dioxide in the interior of the container so as to form carbon dioxide snow in the container with simultaneous generation of carbon dioxide vapors; means for withdrawing the carbon dioxide vapors from the container and moving the withdrawn carbon dioxide vapors in the vicinity of said supplying means so that cold from the withdrawn carbon dioxide vapors is transmitted to liquid carbon dioxide supplied by said supplying means, said supplying and withdrawing means being movable between an inoperative position in which said supplying and withdrawing means are located outside the opening of the container and outside of the container and an operative position in which said supplying and withdrawing means are arranged adjacent to the opening of the container; and seating means arranged so that when said supplying and withdrawing means have reached said operative position, said sealing means provide self-sealing of the opening of the container.

2. An apparatus as defined in claim 1; and further comprising means for connection of said supplying means and said withdrawing means to the container so as to provide supply of liquid carbon dioxide through said supplying means into the container and withdrawal of carbon dioxide vapors from the container into and through said withdrawing means.

3. An apparatus as defined in claim 1, wherein said supplying means is displaceable relative to the container so as to adjust a position of a discharge point of liquid carbon dioxide from said supplying means in the container and therefore to adjust distribution of carbon dioxide snow in the interior of the container.

4. An apparatus as defined in claim 1; and further comprising means for moving said supplying means relative to the container and including a frame supporting said supplying means and provided with a plurality of wheels.

5. An apparatus as defined in claim 1; and further comprising liquid dioxide discharging means located inside the container, said liquid dioxide supplying means being releasably connectable with said liquid carbon dioxide discharging means.

6. An apparatus as defined in claim 1; and further comprising means for mounting said supplying means on the container releasably and pivotally around a horizontal axis so as to provide a tight abutment of said supplying means against the container.

7. An apparatus as defined in claim 1, wherein said supplying means are located inside said withdrawing means, said sealing means being arranged on said withdrawing means.

8. An apparatus as defined in claim 1, wherein supplying means and said withdrawing means are both insertable into the interior of the container through the opening of the container.

9. An apparatus as defined in claim 1, wherein said supplying means are arranged inside said withdrawing means and are longer than said withdrawing means, so that in said operative position said supplying means extend into the interior of the container while said withdrawing means is located outside of the container in the region of the opening of the container.

* * * * *